United States Patent
Dao et al.

(10) Patent No.: US 10,270,834 B2
(45) Date of Patent: Apr. 23, 2019

(54) SYSTEM AND METHOD FOR ONLINE MULTIMEDIA STREAMING SERVICES

(71) Applicant: Huawei Technologies Co., Ltd., Shenzhen (CN)

(72) Inventors: Ngoc-Dung Dao, Ottawa (CA); Xu Li, Nepean (CA); Hamidreza Farmanbar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 14/831,653

(22) Filed: Aug. 20, 2015

(65) Prior Publication Data

US 2017/0054776 A1 Feb. 23, 2017

(51) Int. Cl.
*G06F 15/16* (2006.01)
*H04L 29/06* (2006.01)
*H04L 12/24* (2006.01)

(52) U.S. Cl.
CPC .......... *H04L 65/80* (2013.01); *H04L 65/1089* (2013.01); *H04L 65/4084* (2013.01); *H04L 41/5067* (2013.01)

(58) Field of Classification Search
CPC ............. H04L 41/5067; H04L 65/1066; H04L 65/4092; H04L 65/80
See application file for complete search history.

(56) References Cited

U.S. PATENT DOCUMENTS

| | | | |
|---|---|---|---|
| 7,184,397 B1 | 2/2007 | Wilkie et al. | |
| 8,510,458 B2 * | 8/2013 | Nassor | H04N 21/23655 709/231 |
| 9,319,321 B2 * | 4/2016 | Funge | H04L 47/20 |
| 9,426,335 B2 * | 8/2016 | Begen | H04N 5/04 |
| 9,479,807 B1 * | 10/2016 | Bugajski | H04N 21/2402 |
| 9,531,778 B2 * | 12/2016 | Miller | H04L 65/60 |
| 9,640,053 B2 * | 5/2017 | Siann | H04N 7/185 |
| 9,729,287 B2 * | 8/2017 | Reddappagari | H04L 5/0044 |
| 2003/0236902 A1 * | 12/2003 | Weiss | H04L 47/722 709/231 |

(Continued)

FOREIGN PATENT DOCUMENTS

EP 2706701 A1 3/2014

OTHER PUBLICATIONS

Liu et al., "User Experience Modeling for DASH Video," 20th International Packet Video Workshop, Dec. 12, 2013, 19 pages.

(Continued)

*Primary Examiner* — Shean Tokuta
(74) *Attorney, Agent, or Firm* — Slater Matsil, LLP

(57) ABSTRACT

An embodiment method for network optimization includes obtaining a first request to deliver a first data to a node in a network at a first data rate; obtaining a second request to deliver the first data to the node at a second data rate; and determining a flow decision schedule for a streaming session. The determining the flow decision schedule includes: scheduling a steady-state delivery period to deliver the first data at a steady-state data rate in accordance with the first data rate; and performing a best-effort allocation in accordance with the second data rate to determine a schedule for a supplemental delivery period, concurrent with at least a portion of the steady-state delivery period, to deliver the first data at a supplemental data rate.

19 Claims, 5 Drawing Sheets

(56) References Cited

U.S. PATENT DOCUMENTS

| | | | |
|---|---|---|---|
| 2004/0267503 A1* | 12/2004 | Batterberry | H04L 29/06027 702/188 |
| 2007/0039032 A1* | 2/2007 | Goldey | H04N 5/44591 725/114 |
| 2008/0285936 A1* | 11/2008 | Yampanis | H04N 7/17327 386/248 |
| 2008/0316960 A1* | 12/2008 | Daigle | H04L 12/2876 370/329 |
| 2009/0204719 A1* | 8/2009 | Simongini | H04W 4/02 709/231 |
| 2009/0259767 A1* | 10/2009 | Karlsson | H04L 65/4092 709/231 |
| 2010/0150252 A1* | 6/2010 | Camp, Jr. | H04L 65/4015 375/240.27 |
| 2010/0284446 A1* | 11/2010 | Mu | H04B 7/15521 375/211 |
| 2011/0239259 A1* | 9/2011 | Udani | H04L 12/2807 725/85 |
| 2011/0258322 A1* | 10/2011 | Luzzatti | H04L 47/765 709/226 |
| 2011/0306386 A1* | 12/2011 | Centoza | H04W 28/08 455/552.1 |
| 2012/0076009 A1* | 3/2012 | Pasko | H04W 4/003 370/252 |
| 2013/0007191 A1* | 1/2013 | Klappert | H04N 21/23109 709/217 |
| 2013/0007830 A1* | 1/2013 | Klappert | H04H 20/30 725/116 |
| 2013/0028268 A1* | 1/2013 | Nag | H04L 47/822 370/468 |
| 2013/0035107 A1* | 2/2013 | Chan | H04W 28/20 455/453 |
| 2013/0055314 A1* | 2/2013 | Martch | H04N 21/26606 725/58 |
| 2013/0159384 A1* | 6/2013 | Funge | H04L 47/27 709/203 |
| 2013/0267269 A1* | 10/2013 | Fang | H04W 52/10 455/522 |
| 2013/0297819 A1* | 11/2013 | Mittal | H04L 43/0876 709/232 |
| 2014/0002753 A1* | 1/2014 | Griffin | H04W 88/06 348/734 |
| 2014/0036667 A1* | 2/2014 | Balasubramanian | H04W 28/0231 370/230 |
| 2014/0280679 A1* | 9/2014 | Dey | H04L 67/2842 709/213 |
| 2014/0281011 A1* | 9/2014 | Zarom | H04L 65/602 709/231 |
| 2015/0032851 A1* | 1/2015 | Lieber | H04L 65/602 709/219 |
| 2015/0067105 A1* | 3/2015 | Zhu | H04L 65/60 709/219 |
| 2015/0229584 A1* | 8/2015 | Okamoto | H04L 12/5692 709/226 |
| 2015/0312838 A1* | 10/2015 | Torres | H04B 7/18582 370/329 |
| 2016/0105505 A1* | 4/2016 | Gilson | H04L 65/4076 709/219 |
| 2016/0373324 A1* | 12/2016 | Gholmieh | H04L 65/4076 |
| 2017/0013031 A1* | 1/2017 | Kweon | H04L 65/4015 |
| 2017/0054776 A1* | 2/2017 | Dao | H04L 65/80 |
| 2017/0353765 A1* | 12/2017 | Frusina | H04N 21/4621 |
| 2018/0013896 A1* | 1/2018 | Li | H04M 7/0072 |

OTHER PUBLICATIONS

Pourmohammadi-Fallah, et al., "A Fast-Start Rate Control Mechanism for Video Streaming Applications," IEEE International Conference Consumer Electronics, ICCE, Las Vegas, NV, USA, Jan. 2005, 2 pages.

* cited by examiner

SYSTEM AND METHOD FOR ONLINE MULTIMEDIA STREAMING SERVICES

TECHNICAL FIELD

The present invention relates generally to a system and method for online multimedia streaming services, and, in particular embodiments, to a system and method for delivering data at a supplemental data rate.

BACKGROUND

Streaming data for multimedia audio and video presentations accounts for a large portion of traffic over the Internet and other computer data networks, but various disadvantages of existing network components limit users' QoE in viewing this streaming data. Various objective metrics for QoE have been considered, including initial buffering time, stall delay, and rate variation. Yet the lack of signaling protocols for communicating QoE information between components of existing networks prevents network operators from providing traffic engineering (TE) and radio access network (RAN) management services that are tailored to improving QoE.

SUMMARY

In accordance with a first example embodiment of the present invention, there is provided a method for network optimization including: obtaining a first request to deliver a first data to a node in a network at a first data rate; obtaining a second request to deliver the first data to the node at a second data rate; and determining a flow decision schedule for a streaming session. The determining the flow decision schedule includes: scheduling a steady-state delivery period to deliver the first data at a steady-state data rate in accordance with the first data rate; and performing a best-effort allocation in accordance with the second data rate to determine a schedule for a supplemental delivery period, concurrent with at least a portion of the steady-state delivery period, to deliver the first data at a supplemental data rate.

In accordance with another example embodiment of the present invention, there is provided a method for multimedia networking including: sending, by a network node, a request for delivery of a first data from an external media server at a first data rate and in accordance with a QoE setting. The method also includes receiving first data in at least one data flow from the external media server during a streaming session, where during a steady-state delivery period the at least one data flow has a steady-state data rate calculated by at least one external network component in accordance with the first data rate, and during a supplemental delivery period the at least one data flow has a data rate including a sum of: the steady-state data rate; and a supplemental data rate determined by the at least one external network component in accordance with the QoE setting and a best-effort allocation.

In accordance with another example embodiment of the present invention, there is provided a media server including: at least one processor; and at least one non-transitory computer readable medium storing programming for execution by the at least one processor. The programming includes instructions to: receive, from an external network node, a first request to deliver a first data to the external network node at a first data rate and in accordance with a QoE setting; forward the first request to at least one external network component; receive a flow decision schedule from the at least one external network component, where the flow decision schedule includes: a steady-state delivery period for delivering the first data at a steady-state data rate in accordance with the first data rate; a supplemental delivery period, concurrent with at least a portion of the steady-state delivery period, for delivering the first data at a supplemental data rate; and deliver the first data to the external network node during a streaming session in accordance with the flow decision schedule.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

Figure 1:
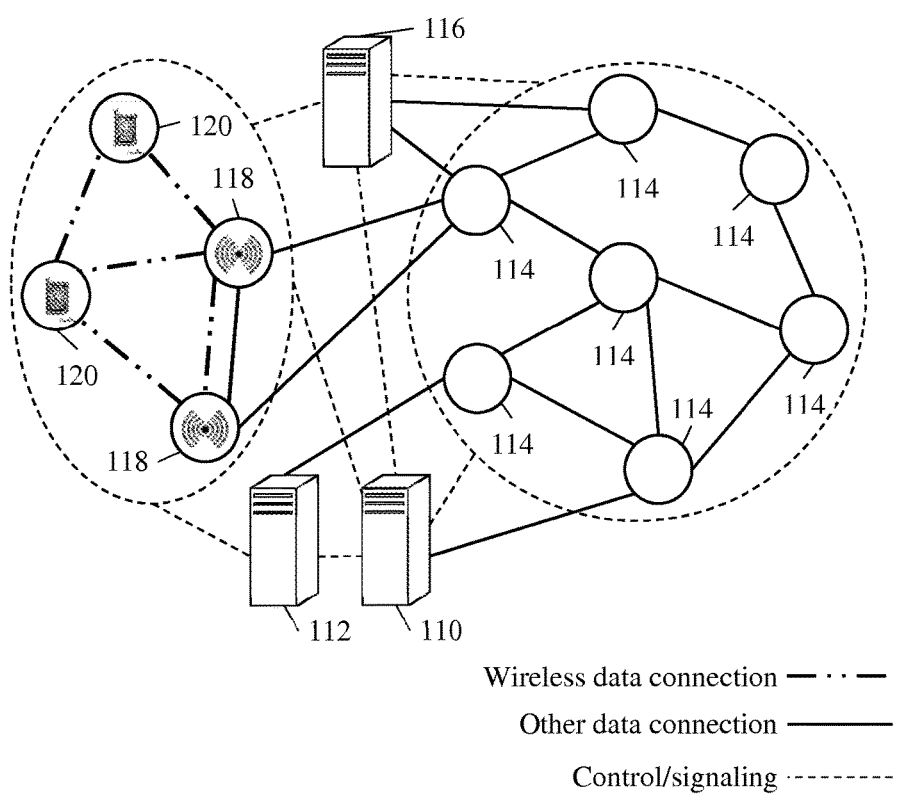
FIG. 1 illustrates an example network for communicating data, in accordance with example embodiments described herein.

In multimedia applications, demand of data flow by nodes in a network may vary such that higher than average demand could happen at any time, including at the beginning of a data session. For example, in real-time video conferencing or video game applications, higher than average demand could be requested to meet a packet delay limit that is smaller than 100 milliseconds (ms). Video I-frames generate a large peak data rate, but this high rate lasts a short time such as, for example, 50 ms. This kind of peak demand is predictable, but a permanent reservation of large bandwidth to serve large peak data rates is inefficient.

In an embodiment, a network schedules delivery of data at an increased data rate to a target user node in accordance with a network optimization calculation. During this network optimization, a supplemental flow of streaming data is temporarily assigned (for calculation purposes only) to the target user node in addition to an ordinary data flow. These theoretical flow assignments are calculated in accordance with a primary data rate request and a secondary data rate request by the target node. The primary rate request is a request for an ordinary, steady-state data flow such as, for example, a flow at a data rate that is typical for an agreed-upon Quality-of-Service (QoS). The secondary rate request may be an input to a best-effort allocation of a supplemental data flow. This secondary requested data rate may be calculated, for example, by multiplying the primary requested data rate by a one-size-fits-many multiplier.

In an embodiment, the theoretical flow assignments grant a respective portion of the primary data rate and secondary data rate that are requested, depending on whether such flow assignments would increase a combined measure of utility for the a portion of the overall network. If the theoretical flow assignments grant some or all of the secondary data rate request, both a steady-state flow and a supplemental flow will be temporarily assigned to the target node. In accordance with these theoretical assignments, the network may then schedule a single data flow to the target node that delivers data at an augmented data rate that is the total of the data rates of the steady-state and the supplemental flow. The network optimization calculation and/or the scheduling of the single data flow may be performed at a time occurring either before an ordinary, steady data flow begins to stream to the target node, or while this steady data flow is already being provided to the target node. The supplemental bandwidth of the single data flow, (i.e. that portion of the augmented data rate that exceeds the steady-state data rate) may be released at a scheduled time so that the data continues to stream to the target node at the steady-state data rate. Alternatively, the data rate of data delivered to the target user node may be increased by the supplemental data rate at a time during which data is already being provided to the target user node at the steady-state data rate.

In an embodiment, scheduling the augmented data flow supports an increase in one or more measures of user QoE. For example, one key QoE metric that is neglected by existing networks is the amount of time that a user must wait before multimedia playback can begin due to initial buffering by a user application. There is a strong correlation between this initial delay and impairment of subjective user experience. Nevertheless, because it is almost impossible to control the end-to-end channel throughput for current wired and wireless networks, there is an absence of techniques to reduce the initial buffering time for streaming data. Users often need to wait tens of seconds for a video or other multimedia presentation to be shown after clicking the "play" button on a user application. This waiting time is typically proportional to a threshold amount of data that must be buffered before an application will allow multimedia playback. For example, when an application sets a threshold for buffered data corresponding to 10 seconds of playback time at an average link throughput of 1 Megabit per second (Mbps), a user must wait at least 10 seconds before a multimedia presentation can begin playing.

FIG. 1 illustrates an embodiment of a network for communicating data. The network includes components that are connected by mobile wireless connections as part of a RAN, those that are connected by relatively less mobile facilities (for example, loose electrical cables, fiber optic cables, or microwave relay stations), or both. Components of the network include TE optimizer 110, RAN coordinator 112, core network nodes 114, media server 116, and RAN nodes 118. The network formed by these interconnected components may be, for example, the Internet, a local area network, a wide area network, and the like. The network also includes wireless nodes 120, which together with the aforementioned network components may also form a Software-Defined Network (SDN), for example, a fifth-generation mobile network.

In embodiments of the network, a centralized flow decision schedule is calculated for the network such that: (1) data rate/resource allocation decisions and RAN coordination decisions are optimized, (2) supplemental bandwidth is allocated for delivery during scheduled periods to targeted users at nodes 114 and 118, and (3) at other times this supplemental bandwidth can be released and assigned to other data flows. Supplemental bandwidth is scheduled to augment ordinary scheduled data bandwidth during a period of increased flow to a node. The flow decision schedule allocates the supplemental data rate and the ordinary, steady-state data rate in accordance with a primary rate request and a secondary rate request for data flow to the node. The primary request is a request to receive a data flow at a steady rate. To partially or completely satisfy the primary and secondary requested data rates, steady-state and supplemental data rates are respectively allocated as part of a flow decision schedule. In some embodiments, the primary rate request may seek a data rate that is typical of a level of QoS provisioning to the node, such as, for example, a negotiated or guaranteed data rate. In some embodiments, both the primary rate request and the secondary rate request are satisfied on a best-effort basis through increasing a combined measure of utility for a portion of the overall network, but the primary rate request is given greater weight in measuring this network utility. In other embodiments, only the secondary rate request is satisfied on a best-effort basis.

The various network components 110, 114, 116, 118, 120 may exchange data, control, and signaling information, and one or more signaling protocols may be implemented to act as abstraction/mediation levels between components' different programming or operating system environments. One or more application programming interfaces (APIs) may also be implemented to access, remotely invoke, and/or hide the implementation details of these signaling protocols. These APIs may also be accessible by network operators to support over-the-top (OTT) media streaming services, which do not require a network operator to access the content of data to determine its control or distribution.

In an embodiment, TE optimizer 110 and RAN coordinator 112 are logical components and can be implemented in the same physical device or in a distributed manner on multiple physical devices. Examples of core network nodes 114 include routers, switches, and servers. One or more RAN nodes 118 comprising wireless access points (APs) are wirelessly connected to one or more wireless nodes 120 comprising user equipment (UE). The APs of the RAN nodes 118 each may include any component capable of providing wireless access by, inter alia, establishing uplink and/or downlink connections with the UEs of the wireless nodes 120, such as a base transceiver station, an enhanced base station, a femtocell, or other wirelessly enabled devices. Each of the various nodes 114, 118, 120 may be capable of receiving data from other nodes and transmitting or forwarding data to other nodes. The UEs of the wireless nodes 120 may include any component capable of establishing a wireless connection with the APs of the RAN nodes 118. Examples of UEs include smart phones, tablet computers, and laptops. Wireless nodes 120 may be wirelessly connected to each other. Connections between the RAN nodes 118 may include wired and wireless connections. The RAN nodes 118 may include routers, switches, and gateways.

In an embodiment, media server 116 hosts media segments containing data streams required for decoding and displaying one or more multimedia (audio and/or video) presentations. Media server 116 also hosts multimedia description information. The multimedia description information provides instructions on the location of multimedia segments as well as the timing and relation of the segments in forming a multimedia presentation. Any of nodes 114, 118, 120 may request delivery from media server 116 of one or more data flows of streaming data in the multimedia segments.

A flow decision schedule provided by any of TE optimizer 110 and RAN coordinator 112, and including at least one of a TE decision and radio coordination (RC) decision directs media server 116 to send streaming data in the requested data flows. These flow decisions include decisions about how much of the data bandwidth that is requested by a node will be granted. The decisions to grant flow requests may be calculated based on whether doing so will increase a combined measure of overall network utility. Such flow decisions may include a decision to grant the target node a steady flow of data (e.g., a data flow at a typical QoS data rate). Flow decisions may also include a decision to augment the data rate of this data flow with supplemental bandwidth to the target node allocated on a best effort basis. In an embodiment, the steady-state bandwidth may also be allocated on a best effort basis, at a higher priority than the supplemental bandwidth. The steady-state data rate may thus be permitted to be allocated as either larger or smaller than the average data rate so that the total streaming data rate to the target node may be adaptive to changing network conditions at each update of the flow decision schedule. The media server 116 may then adjust both supplemental and steady-state data rates in response to these allocations in the flow decision schedule.

The supplemental bandwidth may be scheduled to augment the steady-state bandwidth at any time on or after the media server 116 has initiated the data flow to the target node. The data flow may continue to be provided at this augmented data rate for any duration during which the data flow is being provided to the target node.

An advantage of an embodiment of the present invention is that control and signaling between network components may allow wired and wireless networks to improve QoE performance for multimedia streaming services while efficiently using network capacity and resources.

A further advantage of an embodiment is that supplemental data rates may be provided for targeted data flows to provide improved QoE performance, such as support for high peak data rates and near zero-delay delivery of multimedia streaming services.

The nodes 114, 118, 120 may request data flows from media server 116 in accordance with one or more QoE settings, and may also provide it other QoE information, such as application settings and streaming session information. Illustrative examples of application settings include the amount of data that must be buffered before playback of streaming data can begin or can resume after a stall, or the amount of playback time that must be buffered before playback begins or resumes. Illustrative examples of streaming session information include the amount of playback time elapsed, feedback on actual QoE levels experienced during playback, and the like.

Streaming session information provided by the nodes 114, 118, and 120 to the media server 116 may also include, for example, a notification from a user node when a playback buffer has sufficiently filled such that streaming playback has begun or resumed. Media server 116 may in turn inform TE optimizer 110 and/or RAN coordinator 112 that playback has begun or resumed at the node. This notification is useful since the packet transmission of the streaming data is subject to errors, with the actual throughput to the nodes 114, 118, and 120 being potentially less than the allocated data rate, resulting in a buffering time that is longer than that computed by TE optimizer 110 and/or RAN coordinator 112. Notifying network elements when playback begins or resumes helps avoid this mismatch, allowing TE optimizer 110 and/or RAN coordinator 112 to update the flow decision schedule to change the resource allocation for the node.

QoE settings requested for data flows to nodes 114, 118, 120 may be, for example, QoE objectives or desired QoE levels. Illustrative examples of QoE objectives include decreasing initial delay, decreasing stall delay, decreasing rate variation, increasing average data rate, or increasing peak data rate. Examples of desired QoE levels include a desired initial delay, a desired stall delay, a desired rate variation, a desired average data rate, and a desired peak data rate for delivery of streaming data. In an embodiment, the desired initial delay level corresponds to a maximum startup period during which a data buffer is filled to an application-defined threshold before playback can begin. In an embodiment, the desired stall delay level is a desired maximum single stall duration for rebuffering data during a stall, a desired maximum total stall duration, a desired maximum number of stalls, a desired maximum frequency of stalls (which may be expressed as a minimum duration between or before stalls), or any combination of the foregoing. In an embodiment, the desired maximum single stall duration corresponds to a desired maximum rebuffering period during which a data buffer is filled to a threshold that a user application requires before playback can resume. In an embodiment, the desired rate variation level is a desired maximum number of rate switching occurrences, a desired maximum average magnitude of each occurrence of rate switching, or a combination of the foregoing. In an embodiment, a signaling protocol and API are implemented that allow media server 116 and any of nodes 114, 118, 120 to exchange QoE settings and other QoE information.

Media server 116 provides TE optimizer 110 with QoE settings and other QoE information for one or more requested data flows. Media server 116 sends streaming data to any of nodes 114, 118, 120 over a one-to-one unicast connection, over multicast-routed connections, or over multipath connections. Media server 116 may send streaming data as OTT content. In accordance with the flow decision schedule, media server 116 at times sends streaming data at a temporary data rate that is faster than the steady-state data rate of a target data flow. Media server 116 sends streaming data in the target data flow at this faster temporary data rate to partially or completely satisfy a QoE objective or desired QoE level. The faster temporary data rate may be a best-effort data rate calculated in accordance with aggregate network resources and constraints. In an embodiment, the flow decision schedule is updated throughout the course of a streaming session to maintain delivery of data at the faster temporary data rate or at the steady-state data rate, depending on the time of update.

In an embodiment, a flow decision schedule directs media server 116 to send streaming data in a requested data flow at an augmented data rate to improve QoE for traffic with varying data rates, as is the case with real-time video services such as video games and video conferencing. In some embodiments, supplemental bandwidth for this varying-rate data flow may be provided during the entire session. In some embodiments, to ensure that the flow decision schedule provides enough resources to other ordinary-rate data flows in the network, allocation for these ordinary data flows is first completed before remaining resources are then assigned in a best-effort allocation to provide the requested supplemental bandwidth. The supplemental bandwidth will be provided until new flows enter or existing flows exit the network, or until the data rates of existing flows changes. A new flow decision schedule will then be calculated while the streaming session is already in progress in order to adapt to the changing dynamic of the network load.

In some embodiments, the flow decision schedule is calculated in accordance with a preliminary optimization calculation for the network. This optimization calculation is calculated in accordance with inputs that may respectively include, for one or more periods of data flow to targeted nodes, both a primary request for data flow at an ordinary, steady-state rate and a secondary request for data flow at a supplemental rate. The primary data rate request and the secondary data rate request are requests for data flows to one of the targeted nodes during particular periods of the streaming session. For example, one of nodes 114, 118, 120 may request a data flow with a primary requested rate of 1 Mbps for the remainder of a 110-second streaming session that started 10 seconds ago, and the node may also make a secondary data rate request of 9 Mbps for a 5-second supplemental data delivery period to start 20 seconds from now. The total requested rate for this node would then be 1 Mbps at 0-20 seconds from now, 10 Mbps at 20-25 seconds from now, and 1 Mbps at 25-100 seconds from now.

In some embodiments, a flow decision schedule directs media server 116 to send streaming data in a requested data flow at a faster startup data rate for a required startup period at the beginning of a streaming session until multimedia playback begins. After this startup period, the flow decision schedule directs media server 116 to send streaming data in this target data flow at the steady-state data rate.

In a first fast startup embodiment, a secondary requested data rate is calculated in accordance with the desired initial delay and the primary requested data rate. In a second fast startup embodiment, the secondary requested data rate is calculated by multiplying the primary requested data rate by a one-size-fits-many or arbitrarily pre-determined multiplier that may be, e.g., a system constant or an application or network setting. For example, one of nodes 114, 118, 120 may request a data flow with a primary requested data rate of 1.5 Mbps and a desired initial delay of 1 second or less, and a user application operating at a requesting node may arbitrarily determine a threshold duration of buffered playback time of 6 seconds that must be buffered before multimedia playback begins (which is equivalent to a threshold data size of 9 Megabits delivered at 1.5 Mbps). According to the first fast startup embodiment, a secondary requested data rate of at least 7.5 Mbps could be calculated in accordance with the desired initial delay and the primary requested rate. When this secondary requested rate augments the primary requested rate of 1.5 Mbps, the total requested data rate would be a request for providing 9 Megabits to the requesting node in a 1 second startup period. According to the second fast startup embodiment, if the pre-determined multiplier is, for example, an application setting that is arbitrarily chosen to be 4 times any primary rate request, a secondary requested data rate of 6 Mbps would be calculated for a primary rate request of 1.5 Mbps. Added together, the primary rate request and the secondary rate request would be a total rate request for 7.5 Mbps in the 1 second startup period. A steady-state data rate of 0.9 Mbps and a supplemental data rate of 3.6 Mbps might be respectively allocated to satisfy a portion of the primary requested data rate and a portion of the secondary requested data rate, for example, which summed together would provide an allocated startup data rate of 4.5 Mbps to the target data flow. In this example, if media server 116 were to send streaming data at this startup data rate of 4.5 Mbps, the user would only have to wait a startup period of 1.2 seconds for the playback buffer to be filled with 6 seconds' worth of data at the steady-state data rate of 0.9 Mbps, after which time playback could begin.

TE optimizer 110 includes a control and signaling interface to other components within the network. TE optimizer 110 may receive TE decision inputs from any of the various nodes 114, 118, 120, media server 116 and RAN coordinator 112. TE decision inputs may include network topology information, which includes routers and UEs in the topology; configuration information, such as network objectives or constraints, multipath vs. single path information, whether network traffic is unicast vs. multicast or mixed traffic, etc.; network resources concerning the various nodes 114, 118, 120 or media server 116, such as link capacity, buffer size, per node operating cost, per link operating cost, etc.; RAN information; information regarding sources and destinations of data; QoE settings, actual QoE levels or other streaming session information, application settings, or other QoE information; or any combination of the foregoing. In an embodiment, a signaling protocol and optionally an API are implemented that allow one or more of TE optimizer 110, nodes 114, 118, 120, media server 116 and RAN coordinator 112 to exchange QoE information, RAN information, or other TE decision inputs. For example, media server 116 provides an output of QoE information (a QoE setting, an application setting, an actual QoE level, an elapsed playback time, other streaming session information, etc.) that is formatted according to the signaling protocol's mediation programming environment. TE optimizer 110 then receives this QoE information and formats it by, for example, storing this information or its address in a form that is compatible with the TE optimizer programming environment. TE optimizer 110 then uses this QoE information as an input for calculating TE decisions. These TE decisions are then formatted according to the signaling protocol's mediation environment and provided to, for example, RAN coordinator 112, which then formats the TE decisions according to its own programming environment and uses them for making RC decisions, and so on.

A flow decision schedule provided by one or both of TE optimizer 110 and RAN coordinator 112 includes one or more TE decisions. In a first embodiment, TE decisions are computed solely by TE optimizer 110. In a second embodiment, TE decisions are computed by a joint decision-making process performed by both TE optimizer 110 and RAN coordinator 112. TE decisions may direct end-to-end paths (routes) or per route resource/rate allocation; links used for end-to-end routing or per link resource/rate allocation; timing information associated with any of the foregoing decisions; or any combination of the foregoing. In a first embodiment, these TE decisions are calculated at a calculation time that is prior to the start of a streaming data session in which data is delivered to nodes 114, 118, 120. In a second embodiment, these TE decisions are calculated after the streaming data session has already begun. A TE decision may direct media server 116 to send streaming data at a steady-state allocated data rate that partially or completely satisfies a primary data rate requested for one or more of the data flows to any of the various nodes 114, 118, 120. The steady-state data rate may be adapted to the current end-to-end channel condition so that the stall delay is reduced, so that a guaranteed data rate can be delivered, or both. In some embodiments, the steady-state data rate may be allocated as an average data rate to be delivered over time.

The flow decision schedule may also include one or more radio coordination (RC) decisions computed by RAN coordinator 112. RAN coordinator 112 includes a control and signaling interface to other components within the network. RAN coordinator 112 calculates RC decisions in accordance with RAN information received from TE optimizer 110 and any of RAN nodes 118 and wireless nodes 120. These RC decision inputs include information concerning RAN nodes 118 and wireless nodes 120 that affects radio resource management/mobility management, such as link capacity, buffer size, available spectrum, spectral efficiency over radio links, per node operating cost, per link operating cost, etc. In an embodiment, these RC decisions are calculated by a joint decision-making process involving both TE optimizer 110 and RAN coordinator 112. Illustrative examples of RC decisions include decisions directing control of co-channel interference and other radio transmission characteristics, such as transmit power, spectral allocation, beamforming, handover criteria, modulation scheme, error coding scheme, attach/detach criteria, location management, and the like. In an embodiment, RC decisions are calculated in accordance with QoE information for one or more streaming data flows destined for any of the wireless nodes 120. In a first embodiment, these RC decisions are calculated at a calculation time that is prior to the start of a streaming data session in which data is delivered to nodes 114, 118, 120. In a second embodiment, these RC decisions are calculated after the streaming data session has already begun.

TE optimizer 110 provides TE decisions to any of RAN coordinator 112, media server 116, and nodes 114, 118, 120. RAN coordinator 112 provides RC decisions to RAN nodes 118, TE optimizer 110, and wireless nodes 120. In an embodiment, a signaling protocol and API are implemented that allow TE optimizer 110 and RAN coordinator 112 to exchange TE decisions or RC decisions or to jointly calculate TE decisions, RC decisions, or one or more secondary data rate requests.

Decisions in the flow decision schedule, including TE decisions and RC decisions, may also be calculated in accordance with requests for a secondary data rate for one or more requested data flows. In a first embodiment, a secondary data rate request is computed by TE optimizer 110. In a second embodiment, a secondary data rate request is computed by a joint decision-making process performed by both TE optimizer 110 and RAN coordinator 112. A secondary data rate request is calculated in accordance with, for example, a data flow's primary requested data rate, one or more QoE settings, application settings, network resources and constraints, or any combination of the foregoing. In a first embodiment, the secondary rate request is calculated by multiplying the primary rate request by a constant or by a parameter defined by the network or an application. In a second embodiment, the following procedure is used to calculate a secondary requested data rate (d') in accordance with a threshold duration ($T_{threshold}$) of buffered playback time, a primary requested data rate (d) for the target node, and a desired maximum initial delay ($\hat{T}_{start}$):

(1) find a ratio of the threshold duration divided by the desired initial delay level;

(2) find a product of the primary requested data rate multiplied by the ratio;

(3) find a difference of the primary requested data rate subtracted from the product; and (4) set the secondary requested data rate to at least the level of the difference, in accordance with the following inequality:

$$d' \geq \frac{dT_{threshold}}{\hat{T}_{start}} - d.$$

The flow decision schedule, including TE and RC decisions, is also determined in accordance with a network optimization calculation, which is calculated to increase one or more of several different measures of network utility that are well-known in the art. Network utility measures may be chosen to support various network traffic objectives, for example improving QoE performance, reducing congestion, or improving spectral efficiency. In an embodiment, network utility measures are calculated in accordance with individual QoE utility functions for one or more data flows to nodes 114, 118, 120. Illustrative examples of network utility measures related to QoE include a sum or weighted sum of per-flow QoE utility functions, max-min fairness aggregation or other aggregation of per-flow utility functions, and the like. For example, if a set of candidate TE decisions were to include data rate allocations for a target data flow, a calculated sum of these data rates could be provided as an input parameter to any of several well-known utility functions for network data flows, such as: utility functions having a result that is proportional to the data rate, the logarithm of the data rate, or the arctangent of the data rate, or other proportional fairness utility functions; any of the foregoing utility functions having a result adjusted in accordance with spectral bandwidth usage or in accordance with the changing states of multiple data flows over a single link; any sum, weighted sum, or aggregation of the foregoing; and the like.

It is readily apparent to one of skill in the art that as an alternative to using a calculated data rate as an input parameter to a per-flow QoE utility function, any other actual or calculated QoE level may also be used in accordance with QoE settings and other QoE information. In a first embodiment, a QoE utility function is selected that increases when maximum stall duration, total stall duration, number of stalls, or stall frequency decreases over a range of values. In a second embodiment, a QoE utility function is selected that increases when the number of rate switching occurrences or the average magnitude of each rate switching occurrence decreases over a range of values. In a third embodiment, a QoE utility function is selected that increases as initial delay decreases over a range of values. For example, when a QoE setting indicates a desired initial delay level, the following simple QoE utility function q could be selected that is calculable in accordance the desired maximum initial delay ($\hat{T}_{start}$) and in accordance with a calculated startup period $T_{start}$:

$$q = \left\{ \frac{C\hat{T}_{start}}{T_{start}}, \text{ when } T_{start} > \hat{T}_{start} \mid C, \text{ otherwise} \right\},$$

where C is a constant.

Alternatively, when the QoE setting indicates only an objective of decreasing initial delay instead of a particular desired initial delay level, an exemplary utility function could be expressed as:

$$q = \frac{C}{T_{start}},$$

where C is a constant.

In a fourth embodiment, a QoE utility function is selected that increases when average data rate increases, so long as the average data rate is within a specified range of values. In a fifth embodiment, a QoE utility function is selected that is a sum or weighted sum of any of the QoE utility functions in the foregoing four embodiments.

In addition to being calculated in accordance with network utility measures, the optimization calculation may also be calculated in accordance with various network traffic constraints. Illustrative examples of network traffic constraints include requirements that transmit power, bit-error rate, link load, signal-to-noise ratio or signal-to-interference ratio must not fall below a given amount, such as a given constant or function of data rate, spectral bandwidth, or link capacity, and the like.

A number of software packages are commercially available to perform an optimization calculation for determining theoretical data flows that partially or completely satisfy an optimal network utility. In a first embodiment, this calculation is performed using a sequential optimization that first determines one or more TE decisions or RC decisions in accordance with primary rate requests for one or more data flows, and then determines best-effort rate allocations in accordance with either QoE utility functions or secondary data rate requests for the data flows. In a second embodiment, the network optimization is calculated by solving a joint optimization problem that selects TE and/or RC decisions such that these decisions jointly maximize an aggregation of QoE utility functions for the data flows. In a third embodiment, the network optimization is calculated by solving a joint optimization problem that selects TE and/or RC decisions such that these decisions jointly maximize an aggregation of utility functions of data rates allocated in accordance with primary and secondary rate requests for one or more of the data flows. For example, solving the following linear optimization problem jointly maximizes a weighted sum of utility functions of steady-state and supplemental data flows allocated to partially or completely satisfy primary and secondary data rate requests:

$$\max \sum_{i \in F} (mU(x_i) + U'(y_i)) \text{ s.t.}$$

$$\sum_{k \in R_i} x_{ik} = x_i, \forall i \in F$$

$$x_i \le d_i, \forall i \in F$$

$$\sum_{k \in R'_i} y_{ik} = y_i, \forall i \in F$$

$$y_i \le d'_i, \forall i \in F$$

$$\sum_{i \in F} \sum_{k \in R_i} \delta_e^{i,k} x_{ik} + \sum_{i \in F} \sum_{k \in R'_i} \delta_e^{i,k} y_{ik} \le c_e, \forall e \in G$$

$$x_{ik} \ge 0, \forall k \in R_i, \forall i \in F$$

$$y_{ik} \ge 0, \forall k \in R'_i, \forall i \in F$$

where $d_i$ is a primary data rate requested for flow i to a node;
$d_i'$ is a secondary data rate requested for flow i to a node;
$x_i$ is the rate allocation of flow i for satisfying a primary rate request;
$y_i$ is the rate allocation of flow i for satisfying a secondary rate request;

U is the utility function of primary rate allocation;
U' is the utility function of secondary rate allocation;
m is a very large constant ensuring a flow's soft rate allocation is always inferior to its data rate satisfaction in utility;
$x_{ik}$ is the rate allocation of flow i on its path k for primary data rate satisfaction;
$\delta_e^{i,k}$ indicates whether link e belongs in path k of flow i
$R_i$ is the candidate path set for primary data rate allocation for flow i;
$R_i'$ is the candidate path set for secondary data rate allocation for of flow i;
F is the set of possible flows; and
G is the set of possible links.

In accordance with the theoretical steady-state and supplemental data flows calculated in the foregoing joint optimization, in some embodiments the network may then determine a flow decision schedule that schedules only a respective single data flow to each target node; each single data flow delivers data at an augmented data rate that is the total of the data rates of the steady-state and any supplemental flow to that respective node.

Figure 2:
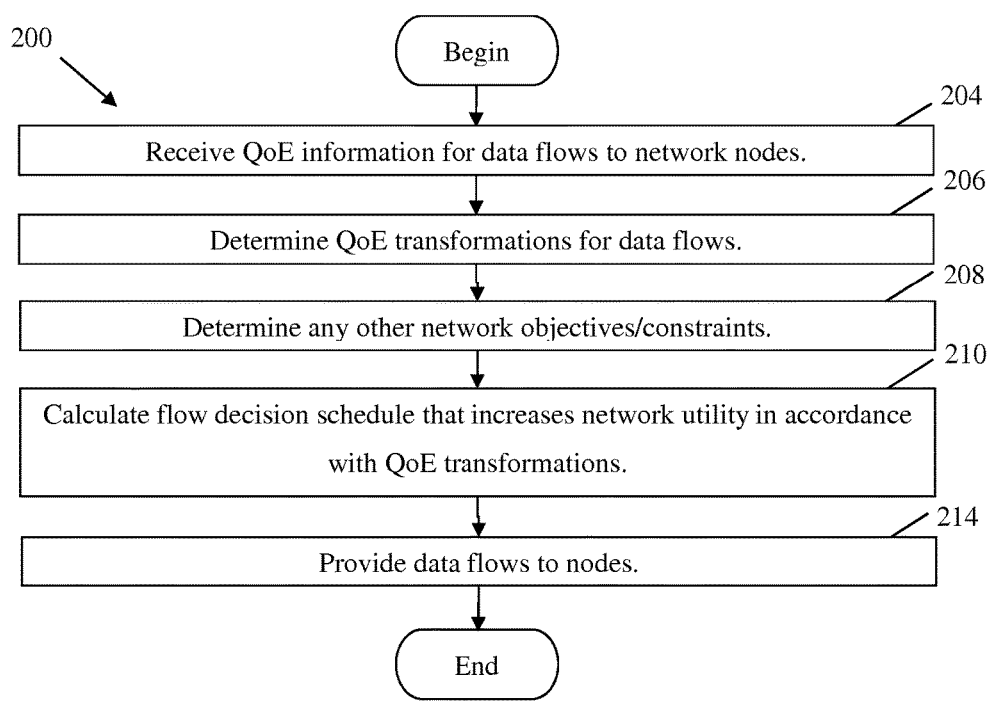
FIG. 2 illustrates an example flow diagram for increasing network utility in accordance with QoE settings for streaming data and in accordance with example embodiments described herein.

FIG. 2 is a flowchart illustrating an embodiment method 200 for a multimedia transmission protocol that increases network utility in accordance with QoE information. Method 200 begins at block 204, where a TE optimizer receives QoE information for a set of one or more data flows to nodes in a network, including data flows to one or more wireless nodes that are wirelessly connected at one or more RAN nodes. This QoE information may include primary rate requests or other QoE settings; a playback threshold measured in data or in time, or other application settings; actual QoE levels, elapsed playback time, or other streaming session information, or any combination of the foregoing. At block 206, a QoE transformation is determined for each data flow in accordance with the QoE information. In a first embodiment, this QoE transformation is a secondary rate request, determined by the TE optimizer, optionally in combination with the RAN coordinator. In a second embodiment, the QoE transformation is a QoE utility function for the data flow, selected by the TE optimizer, optionally in combination with the RAN coordinator. At block 208, the TE optimizer and RAN Coordinator determine any other network resources and/or constraints affecting TE and RC that should be considered, including resources/constraints affecting TE and RC. At block 210, the TE optimizer and RAN coordinator calculate a flow decision schedule to increase network utility in accordance with the QoE transformations and any network resources/constraints, the flow decision schedule comprising one or more TE or RC decisions. At block 214, in accordance with the RC decisions of the flow decision schedule, the RAN nodes provide data flows to the wireless nodes, and in accordance with the TE decisions of the flow decision schedule, a media server provides data flows to any remaining nodes and to the RAN nodes.

Figure 3:
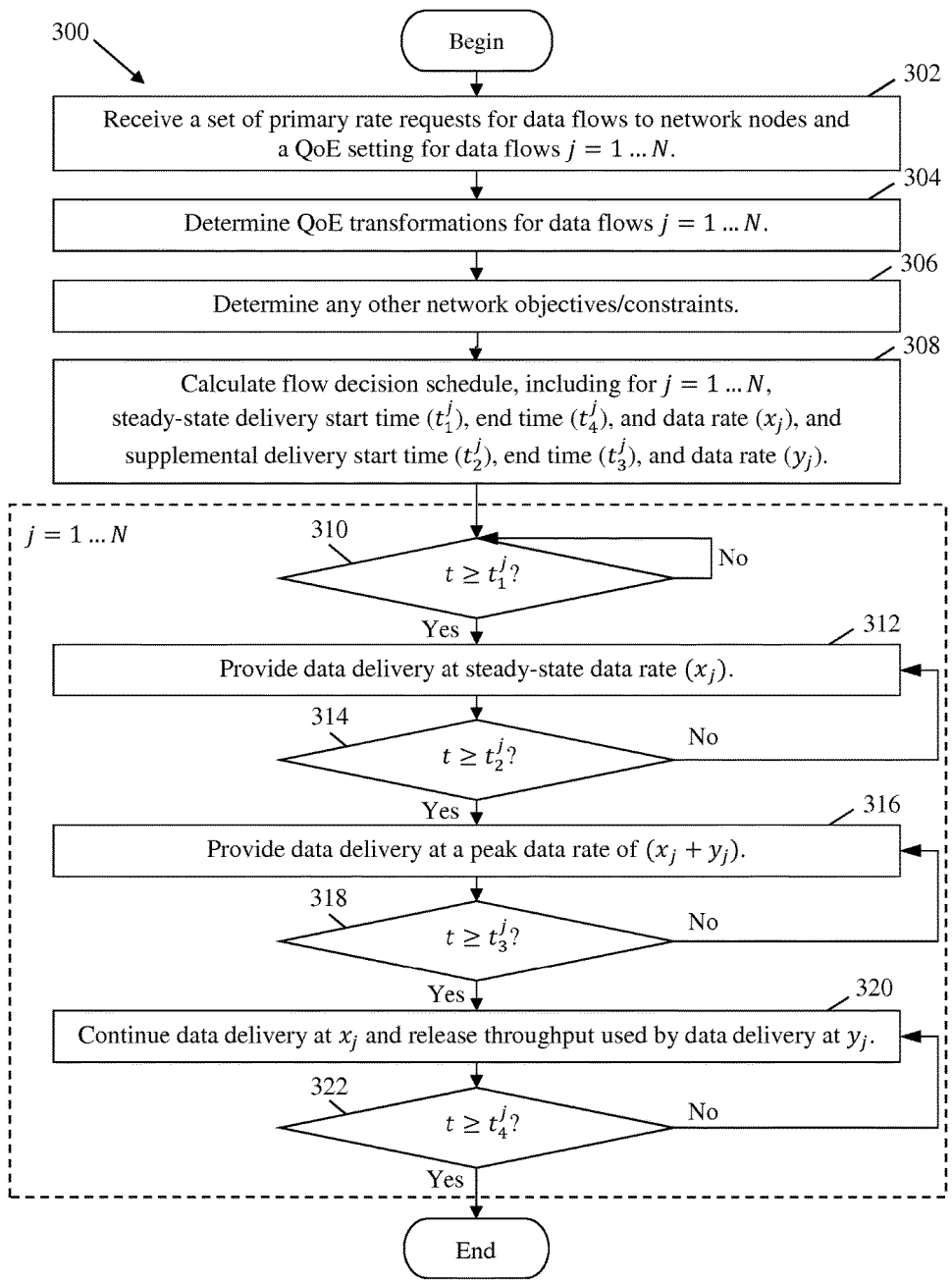
FIG. 3 illustrates an example flow diagram for increasing network utility in accordance with primary data rate requests and a desired QoE setting.

FIG. 3 is a flowchart illustrating an embodiment method 300 for increasing network utility in accordance with primary data rate requests and a desired QoE setting. Method 300 begins at block 302, where a TE optimizer receives a set of primary rate requests for data flows to nodes in a network, where the data flows include a set of N target data flows and also include data flows to one or more wireless nodes that are wirelessly connected at one or more RAN nodes. TE optimizer also receives a desired QoE setting for each data flow j in the set of N data flows. At block 304, the TE optimizer, optionally in combination with the RAN coordinator, determines a QoE transformation for each target data flow in accordance with the desired QoE setting. In a first embodiment, this QoE transformation is a secondary rate request determined in accordance with the desired QoE setting. In a second embodiment, the QoE transformation is a utility function that is selected for the target data flow. The QoE transformation may, for example, include a utility function that increases as a function of the increase in the sum of data rates allocated to a data flow. At block 306, the TE optimizer and RAN coordinator determine any other network resources and/or constraints affecting TE and RC that should be considered. At block 308, the TE optimizer and RAN coordinator calculate a flow decision schedule that includes both TE and RC decisions and that increases network utility in accordance with the QoE transformation for each data flow, the primary rate requests, and any of the network resources/constraints. For each target data flow, the TE decisions of the flow decision schedule include an allocation for a steady-state data rate and a supplemental data rate. The steady-state allocation is a decision for delivering data at a steady-state data rate ($x_j$) in a period having a start time ($t_1^j$) and an end time ($t_4^j$), the start time being not sooner than the session starting time. The supplemental data allocation is a decision for delivering data at a supplemental data rate ($y_j$) in a period having a start time ($t_2^j$) that is not sooner than the steady-state delivery start time, and having a supplemental delivery end time ($t_3^j$) that is not later than the steady-state delivery end time.

Blocks 310-322 are performed for each of the target data flows. At blocks 310, 314, 318, and 322, the media server, RAN coordinator, or RAN nodes determine whether the period for a particular data delivery rate in a target data flow has started or ended. At blocks 312, 316, and 320, in accordance with the RC decisions, the RAN nodes provide data flows to the wireless nodes, and in accordance with the TE decisions, a media server provides data flows to any remaining nodes and to the RAN nodes. At block 312, each of these data flows provides streaming data at the steady-state data rate during the period from the steady-state delivery start time until the supplemental delivery start time. At block 316, each of these data flows provides streaming data at a peak data rate, which is the sum of the steady-state data rate and the supplemental data rate, during the supplemental delivery period. After the supplemental delivery period has ended, at block 320 the link capacity that was previously used to send streaming data at the supplemental data rate is released to the network, while delivery of streaming data continues at its steady-state data rate until the end of the steady-state delivery period.

Figure 4:
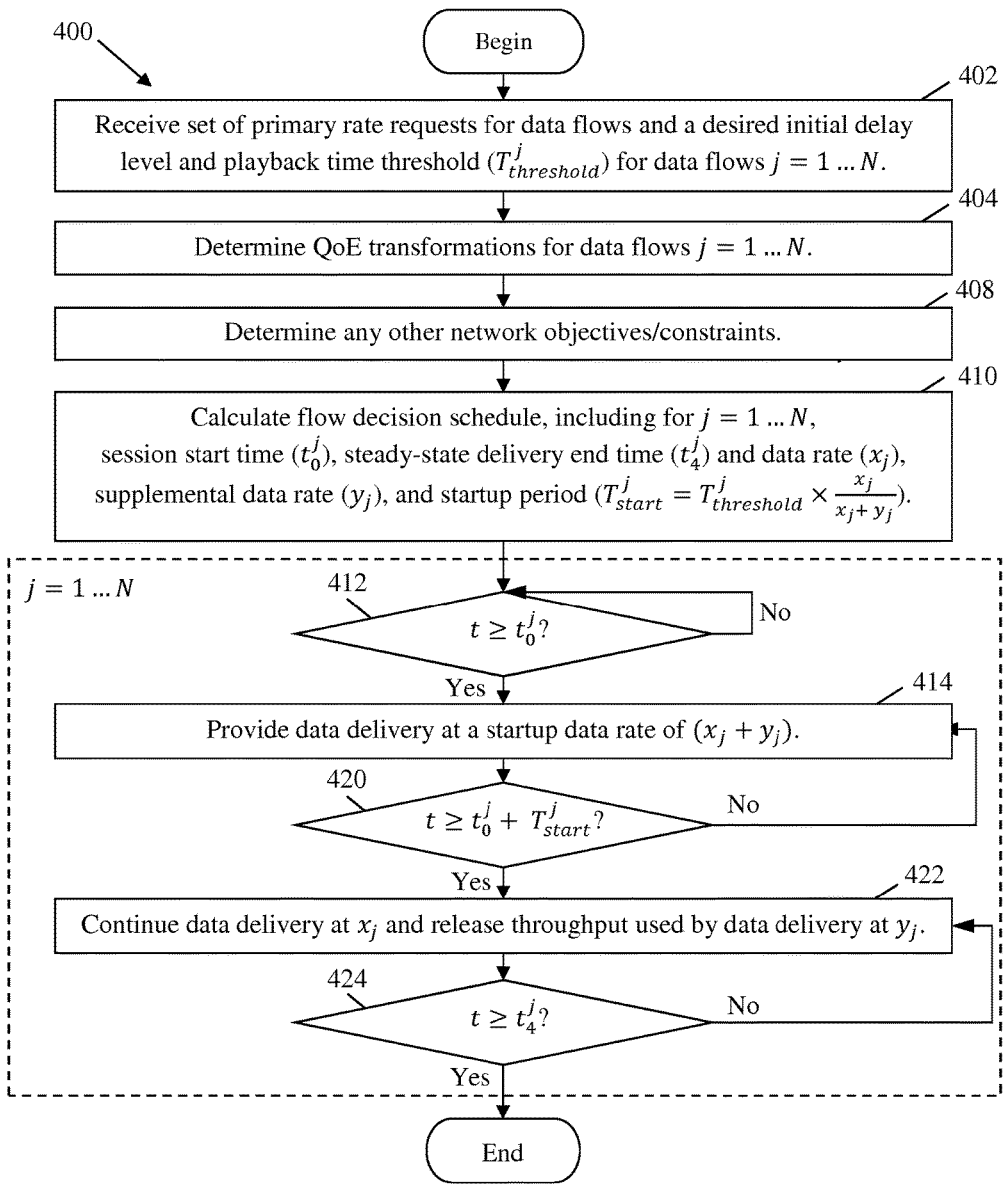
FIG. 4 illustrates an example flow diagram for increasing network utility in accordance with primary data rate requests, a desired initial delay level and a threshold for playback time that must be buffered before playback can begin.

FIG. 4 is a flowchart illustrating an embodiment method 400 for increasing network utility in accordance with primary data rate requests, a desired initial delay level and a threshold for playback time that must be buffered before playback can begin. Method 400 begins at block 402, where a TE optimizer receives a set of primary rate requests for data flows to nodes in a network, where the data flows include a set of N target data flows and also include data flows to one or more wireless nodes that are wirelessly connected at one or more RAN nodes. The TE optimizer also receives a desired initial delay level and a playback time threshold $T_{threshold}^j$ for each target data flow j in the set of N data flows. At block 404, the TE optimizer, optionally in combination with the RAN coordinator, determines a QoE transformation for each target data flow in accordance with the desired initial delay level. In a first embodiment, this QoE transformation is a secondary rate request determined in accordance with the desired initial delay level. In a second embodiment, the QoE transformation is a utility function that is selected for the target data flow. The QoE transformation may, for example, include a utility function that increases as a function of the decrease in initial delay. At block 408, the TE optimizer and RAN coordinator determine any other network resources and/or constraints affecting TE and RC that should be considered. At block 410, the TE optimizer and RAN coordinator calculate a flow decision schedule that includes both TE and RC decisions and that increases network utility in accordance with the QoE transformation for each target data flow, the primary rate requests, and any of the network resources/constraints. For each target data flow, the TE decisions of the flow decision schedule include an allocation for delivering data at a steady-state data rate ($x_j$) in a steady-state delivery period starting at the session start time ($t_0^j$) and ending at time ($t_4^j$). The TE decisions of the flow decision schedule also include, for each target data flow, an allocation for delivering data at a supplemental data rate ($y_j$) in a startup period starting at the session start time ($t_0^j$) and ending after a startup period duration $T_{start}^j$. The duration of the startup period is a calculated initial delay during which streaming data should be sent at a faster startup data rate, which is the sum of the steady-state data rate and the supplemental data rate. The duration of the startup period is calculated by dividing the playback bit threshold by this startup data rate, where the playback bit threshold is the product of the playback time threshold and the steady-state data rate, in accordance with the following equation:

$$T_{start}^j = T_{threshold}^j \times \frac{x_j}{x_j + y_j}.$$

Blocks 412-424 are performed for each of the target data flows. At blocks 412, 420, and 424, the media server, RAN coordinator, or RAN nodes determine whether the period for a particular data delivery in a target data flow has started or ended. At blocks 414 and 422, in accordance with the RC decisions, the RAN nodes provide data flows to the wireless nodes, and in accordance with the TE decisions, a media server provides data flows to any remaining nodes and to the RAN nodes. At block 414, each of these target data flows provides streaming data at a startup data rate for the duration of a startup period beginning at a session start time $t_0^j$. At block 422, if the startup period has ended, the link capacity that was previously used to send streaming data at the supplemental data rate is released to the network, while delivery of streaming data continues at its steady-state data rate until the end of the steady-state delivery period.

Figure 5:
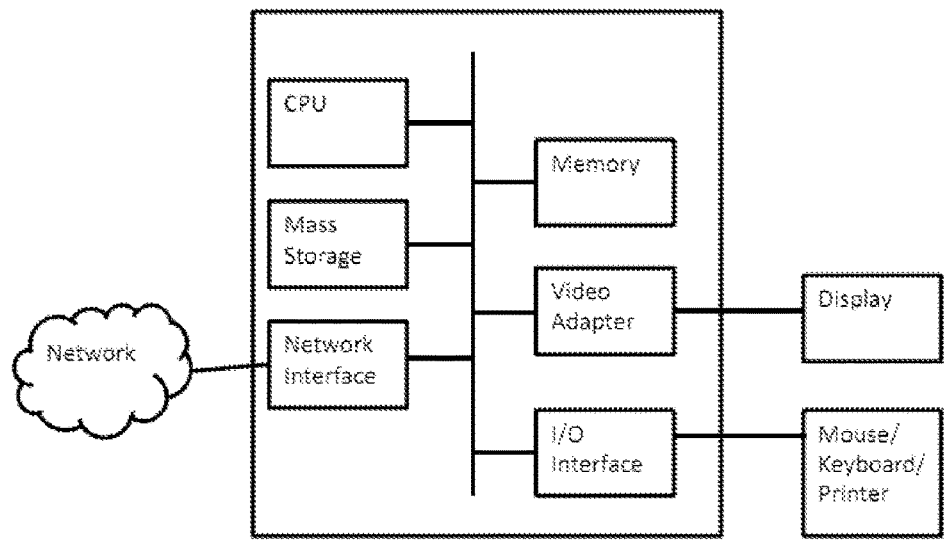
FIG. 5 illustrates an example computing platform that may be used for implementing the devices and methods of example embodiments described herein.

FIG. 5 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area-network for data processing and communications with remote devices, such as other processing units, the Internet, remote storage facilities, or the like.

The following additional example embodiments of the present invention are also provided. In accordance with a first example embodiment, there is provided a method for network optimization including: obtaining a first request to deliver a first data to a node in a network at a first data rate; obtaining a second request to deliver the first data to the node at a second data rate; and determining a flow decision schedule for a streaming session. The determining the flow decision schedule includes: scheduling a steady-state delivery period to deliver the first data at a steady-state data rate in accordance with the first data rate; and performing a best-effort allocation in accordance with the second data rate to determine a schedule for a supplemental delivery period, concurrent with at least a portion of the steady-state delivery period, to deliver the first data at a supplemental data rate.

Also, the foregoing first example embodiment may be implemented to include one or more of the following additional features. The method may also be implemented such that the obtaining the second request includes determining a total requested data rate in accordance with a QoE setting for a streaming session for delivering the first data, and the total requested data rate includes a sum of the first data rate and the second data rate. The method may also be implemented such that the obtaining the second request includes calculating the second data rate in accordance with a QoE setting for a streaming session for delivering the first data. The method may also be implemented such that the QoE setting includes at least one of a desired rate variation level and an objective of decreasing rate variation, a start time of the supplemental delivery period is the same as a start time of the steady-state delivery period, and an end time of the supplemental delivery period is the same as an end time of the steady-state delivery period. The method may also be implemented such that the QoE setting includes at least one of a desired initial delay level and an objective of decreasing initial delay, a start time of the supplemental delivery period is the same as a start time of the steady-state delivery period and a start time for the streaming session, and the supplemental delivery period includes a startup period during which a buffer is filled to a playback threshold. The method may also be implemented such that the flow decision schedule is updated during the steady-state delivery period to update at least one of the steady-state data rate, the steady-state delivery period, the supplemental data rate, and the supplemental delivery period. The method may also be implemented such that the QoE setting includes at least one of a desired stall delay level, an objective of decreasing stall delay, a desired peak data rate, an objective of increasing peak data rate, a desired average data rate, and an objective of increasing average data rate. The method may also be implemented such that the second data rate is a pre-determined integer multiple of the first data rate. The method may also be implemented such that the QoE setting includes a desired initial delay level; and where the obtaining the second request is further in accordance with a threshold duration of buffered playback time, the obtaining the second request including: determining a first ratio of the threshold duration divided by the desired initial delay level; determining a first product of the first data rate multiplied by the first ratio; determining a first difference of the first data rate subtracted from the first product; and setting the second data rate to a level that is not less than the first difference. The method may also be implemented such that the determining the flow decision schedule occurs after a start time of the streaming session.

In accordance with a second example embodiment of the present invention, there is provided a method for multimedia networking including: sending, by a network node, a request for delivery of a first data from an external media server at a first data rate and in accordance with a QoE setting. The method also includes receiving first data in at least one data flow from the external media server during a streaming session, where during a steady-state delivery period the at least one data flow has a steady-state data rate calculated by at least one external network component in accordance with the first data rate, and during a supplemental delivery period the at least one data flow has a data rate including a sum of: the steady-state data rate; and a supplemental data rate determined by the at least one external network component in accordance with the QoE setting and a best-effort allocation.

Also, this second example embodiment may be implemented to include one or more of the following additional features. The method may also be implemented such that the QoE setting includes at least one of a desired rate variation level and an objective of decreasing rate variation, a start time of the supplemental delivery period is the same as a start time of the steady-state delivery period, and an end time of the supplemental delivery period is the same as an end time of the steady-state delivery period. The method may also be implemented such that the QoE setting includes at least one of a desired initial delay level and an objective of decreasing initial delay, a start time of the supplemental delivery period is the same as a start time of the steady-state delivery period and a start time for the streaming session, and the supplemental delivery period includes a startup period during which a buffer is filled to a playback threshold.

The method may also be implemented further including notifying the external media server that the buffer has filled to the playback threshold at an end of the startup period. The method may also be implemented such that the QoE setting includes at least one of a desired stall delay level, an objective of decreasing stall delay, a desired peak data rate, an objective of increasing peak data rate, a desired average data rate, and an objective of increasing average data rate. The method may also be implemented such that the QoE setting includes a desired initial delay level; and where the sending the request for delivery includes sending at least one of a threshold duration of buffered playback time and a threshold data size of buffered playback data. The method may also be implemented further including sending streaming session information to the external media server, where the streaming session information includes at least one of: an amount of playback time elapsed; an actual QoE level experienced during playback; a notification when a playback buffer has sufficiently filled such that streaming playback has begun; and a notification when a playback buffer has sufficiently filled such that streaming playback has resumed following a stall.

In accordance with a third example embodiment of the present invention, there is provided a media server including: at least one processor; and at least one non-transitory computer readable medium storing programming for execution by the at least one processor. The programming includes instructions to: receive, from an external network node, a first request to deliver a first data to the external network node at a first data rate and in accordance with a QoE setting; forward the first request to at least one external network component; receive a flow decision schedule from the at least one external network component, where the flow decision schedule includes: a steady-state delivery period for delivering the first data at a steady-state data rate in accordance with the first data rate; a supplemental delivery period, concurrent with at least a portion of the steady-state delivery period, for delivering the first data at a supplemental data rate; and deliver the first data to the external network node during a streaming session in accordance with the flow decision schedule.

Also, the foregoing third example embodiment may be implemented to include one or more of the following additional features. The media server may also be implemented such that the QoE setting includes at least one of a desired rate variation level and an objective of decreasing rate variation, a start time of the supplemental delivery period is the same as a start time of the steady-state delivery period, and an end time of the supplemental delivery period is the same as an end time of the steady-state delivery period. The media server may also be implemented such that the QoE setting includes at least one of a desired initial delay level and an objective of decreasing initial delay, a start time of the supplemental delivery period is the same as a start time of the steady-state delivery period and a start time for the streaming session, and the supplemental delivery period includes a startup period during which a buffer is filled to a playback threshold. The media server may also be implemented such that the programming further includes instructions to: receive an updated flow decision schedule during the steady-state delivery period to update at least one of the steady-state data rate, the steady-state delivery period, the supplemental data rate, and the supplemental delivery period. The media server may also be implemented such that the QoE setting includes at least one of a desired stall delay level, an objective of decreasing stall delay, a desired peak data rate, an objective of increasing peak data rate, a desired average data rate, and an objective of increasing average data rate. The media server may also be implemented such that the programming further includes instructions to receive the flow decision schedule after a start time of the streaming session.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for network optimization comprising:
   obtaining a first request to deliver a first data to a node in a network at a first data rate;
   obtaining a second request to deliver the first data to the node at a second data rate in accordance with a threshold duration of buffered playback time, wherein the obtaining the second request comprises:
      calculating the second data rate in accordance with a quality of experience (QoE) setting for a streaming session for delivering the first data, wherein the QoE setting comprises a desired initial delay level;
      determining a first ratio of the threshold duration divided by the desire initial delay level;
      determining a first product of the first data rate multiplied by the first ratio;
   determining a first difference of the first data rate subtracted from the first product; and
      setting the second data rate to a level that is not less than the first difference; and
   after obtaining the second request, determining a flow decision schedule for the streaming session, wherein the determining the flow decision schedule comprises:
      scheduling a steady-state delivery period to deliver the first data at a steady-state data rate in accordance with the first data rate; and
      performing a best-effort allocation in accordance with the second data rate to determine a schedule for a supplemental delivery period based on the QoE setting, the supplemental delivery period being shorter than the steady-state delivery period to deliver the first data at both the steady-state data rate and a supplemental data rate during at least a portion of the steady-state delivery period that is concurrent with the supplemental delivery period, wherein the scheduling comprises scheduling the steady-state delivery period to deliver the first data only at the steady-state data rate during portions of the steady-state delivery period that are not concurrent with the supplemental delivery period.

2. The method of claim 1, wherein
   the obtaining the second request comprises determining a total requested data rate in accordance with the QoE setting for a streaming session for delivering the first data, and
   the total requested data rate comprises a sum of the first data rate and the second data rate.

3. The method of claim 1, wherein
   the QoE setting comprises at least one of a desired rate variation level and an objective of decreasing rate variation,
   a start time of the supplemental delivery period is the same as a start time of the steady-state delivery period, and an end time of the supplemental delivery period is the same as an end time of the steady-state delivery period.

4. The method of claim 1, wherein
the QoE setting comprises at least one of a desired initial delay level and an objective of decreasing initial delay,
a start time of the supplemental delivery period is the same as a start time of the steady-state delivery period and a start time for the streaming session, and
the supplemental delivery period comprises a startup period during which a buffer is filled to a playback threshold.

5. The method of claim 1, wherein the flow decision schedule is updated during the steady-state delivery period to update at least one of the steady-state data rate, the steady-state delivery period, the supplemental data rate, and the supplemental delivery period.

6. The method of claim 1, wherein the QoE setting comprises at least one of a desired stall delay level, an objective of decreasing stall delay, a desired peak data rate, an objective of increasing peak data rate, a desired average data rate, and an objective of increasing average data rate.

7. The method of claim 1, wherein the second data rate is a pre-determined integer multiple of the first data rate.

8. The method of claim 1, wherein the determining the flow decision schedule occurs after a start time of the streaming session.

9. A method for multimedia networking comprising:
sending, by a network node, a request for deliver)' of a first data from an external media server at a first data rate and in accordance with a quality of experience (QoE) setting comprising at least one of a desired initial delay level and an objective of decreasing initial delay;
after sending the request, receiving, by the network node, the first data in at least one data flow from the external media server during a streaming session, wherein
during a steady-state delivery period, the at least one data flow has a steady-state data rate calculated by at least, one external network component, in accordance with the first data rate, and
during a supplemental delivery period the at least one data flow has a data rate comprising a sum of:
the steady-state data rate; and
a supplemental data rate determined by the at least one external network component in accordance with the QoE setting and a best-effort allocation; and
notifying the external media server that a buffer has filled to a playback threshold at an end of a startup period;
wherein the supplemental delivery period is based on the QoE setting;
wherein the supplemental delivery period is shorter than the steady-state delivery period;
wherein the supplemental delivery period is concurrent with at least a portion of the steady-state delivery period;
wherein during portions of the steady-state delivery period that are not concurrent with the supplemental delivery period, the at least one data flow has only the steady-state data rate;
wherein a start time of the supplemental delivery period is the same as a start time of the steady-state delivery period; and
wherein the supplemental delivery period comprises the startup period during which the buffer is filled to the playback, threshold.

10. The method of claim 9, wherein
the QoE setting comprises at least one of a desired rate variation level,
and
an end time of the supplemental delivery period that is the same as an end time of the steady-state delivery period.

11. The method of claim 9, wherein the QoE setting comprises at least one of a desired stall delay level, an objective of decreasing stall delay, a desired peak data rate, an objective of increasing peak data rate, a desired average data rate, and an objective of increasing average data rate.

12. The method of claim 9,
wherein the QoE setting comprises a desired initial delay level; and
wherein the sending the request for delivery comprises sending at least one of a threshold duration of buffered playback time and a threshold data size of buffered playback data.

13. The method of claim 9, further comprising sending streaming session information to the external media server, wherein the streaming session information comprises at least one of:
an amount of playback time elapsed;
an actual QoE level experienced during playback;
a notification when a playback buffer has sufficiently filled such that streaming playback has begun; and
a notification when a playback buffer has sufficiently filled such that streaming playback has resumed following a stall.

14. A media server comprising:
at least one processor; and
at least one non-transitory computer readable medium storing programming for execution by the at least one processor, the programming comprising instructions to:
receive, from an external network node, a first request to deliver a first data to the external network node at a first data rate and in accordance with a quality of experience (QoE) setting comprising at least one of a desired initial delay level and an objective of decreasing initial delay;
forward the first request to at least one external network component;
after forwarding the first request, receive a flow decision schedule from the at least one external network component, wherein the flow decision schedule comprises:
a steady-state delivery period for delivering the first data at a steady-state data rate in accordance with the first data rate;
a supplemental delivery period based on the QoE setting for delivering the first data at both the steady-state data rate and a supplemental data rate, wherein the supplemental delivery period is shorter than the steady-state delivery period and concurrent with at least a portion of the steady-state delivery period, wherein the steady-state delivery period comprises portions that are not concurrent with the supplemental delivery period, wherein the steady-state delivery period is for delivering the first data only at the steady-state data rate during the portions that are not concurrent with the supplemental delivery period, wherein a start time of the supplemental delivery period is the same as a start time of the steady-state delivery period, and wherein the supplemental delivery period comprises a startup period during which a buffer is filled to a playback threshold;
receive a notification that the buffer has filled to the playback threshold at an end of the startup period: and
deliver the first data to the external network node during a streaming session in accordance with the flow decision schedule.

15. The media server of claim 14, wherein
the QoE setting comprises at least one of a desired rate variation level,
and
an end time of the supplemental delivery period is the same as an end time of the steady-state delivery period.

16. The media server of claim 14, wherein the programming further comprises instructions to:
receive an updated flow decision schedule during the steady-state delivery period to update at least one of the steady-state data rate, the steady-state delivery period, the supplemental data rate, and the supplemental delivery period.

17. The media server of claim 14, wherein the QoE setting comprises at least one of a desired stall delay level, an objective of decreasing stall delay, a desired peak data rate, an objective of increasing peak data rate, a desired average data rate, and an objective of increasing average data rate.

18. The media server of claim 14, wherein the programming further comprises instructions to receive the flow decision schedule after a start time of the streaming session.

19. The method of claim 1, wherein the supplemental delivery period is determined based on a playback time threshold, the first data rate, and the second data rate.

* * * * *

UNITED STATES PATENT AND TRADEMARK OFFICE
CERTIFICATE OF CORRECTION

PATENT NO.        : 10,270,834 B2
APPLICATION NO.   : 14/831653
DATED             : April 23, 2019
INVENTOR(S)       : Ngoc Dung Dao et al.

Page 1 of 1

It is certified that error appears in the above-identified patent and that said Letters Patent is hereby corrected as shown below:

In Column 18, Line 27, Claim 1, delete "desire" and insert --desired--.

Signed and Sealed this
Twenty-seventh Day of August, 2019

Andrei Iancu
*Director of the United States Patent and Trademark Office*